Sept. 13, 1932. C. M. SCHAEFFER 1,877,695
SPEED REDUCING GEAR
Filed Feb. 7, 1930
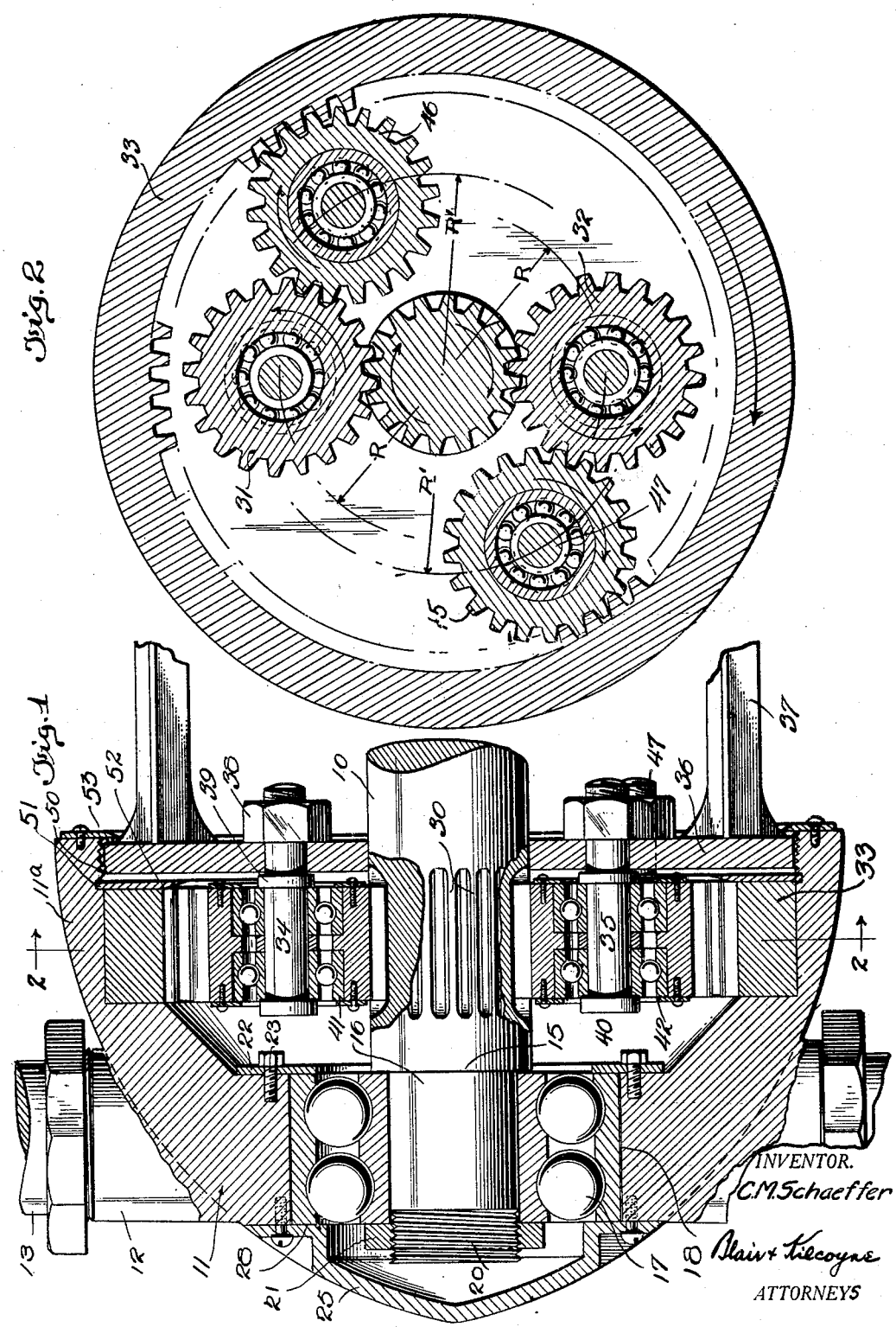
INVENTOR.
C. M. Schaeffer
Blair & Kilcoyne
ATTORNEYS Patented Sept. 13, 1932

1,877,695

UNITED STATES PATENT OFFICE

CHARLES M. SCHAEFFER, OF EMAUS, PENNSYLVANIA

SPEED REDUCING GEAR

Application filed February 7, 1930. Serial No. 426,625.

This invention relates to reducing gear, and more particularly to reducing gear which may provide a drive connection between the power shaft and the propeller element of an aeroplane. It will be recognized from the following analysis of the invention, however, that the reducing gear as disclosed has wide utility in association with other mechanical drive assemblies, and all such applications are to be fairly included within the scope of the following description and claims.

An object of the present invention is to provide a system of reducing gear, which is characterized by mechanical strength and durability, and which possesses a high degree of mechanical efficiency and simplicity. A further object is to provide an improved reducing gear of the circular, internal type, thus to permit cowling of the gear assembly, in which the tortional and thrust strains are suitably balanced. A further object is to provide a speed reducing assembly of uniform over-all dimensions, which permits different resultant speeds by the substitution of gears of different diameters. A further object is the provision of a gear system in which the frictional power losses are reduced to a minimum, and in which the developed resultant pressure is substantially in the direction of rotation of the gear parts. A further object is to provide an improved drive connection between the drive shaft and propeller of an aeroplane.

Other objects will be in part obvious from the annexed drawing and in part indicated from the following analysis of this invention, in which reference is made to the accompanying drawing illustrating an embodiment of my idea.

In the drawing—

Fig. 1 is a vertical section thru a reducing gear assembly interposed between the power shaft of an aeronautical motor and a propeller; and Fig. 2 is a section generally along the lines 2—2 of Fig. 1.

In the drawing, the reference character 10 designates the power shaft of any aeronautical motor or engine constituting the drive element of the gear assembly. The driven element, generally indicated at 11, comprises, in the illustrated embodiment, a propeller hub which is preferably cast of some light-weight metal, such as aluminum or an alloy thereof, integrally with the blade shanks 12. As is generally understood, the blades 13 of the propeller are screwed into or otherwise secured to the shanks 12 and are driven with the hub 11.

The hub is cast hollow and is provided with an enlarged annular skirt 11a forming a housing for the gear system to be described, the motor shaft 10 extending therethru and being provided with a shoulder 15 defining a shaft end portion 16 of reduced diameter. Suitable radial thrust bearings, generally indicated at 17, are provided on the reduced end portion 16, the bearings 17 forming a revoluble support or mounting for the hub 11, which is provided with a machined aperture 18 disposed axially of the shaft 10 and cooperating with the outer ring of the bearing 17.

The shaft 10 terminates in a threaded end 20 on which is threaded a lock nut 21 of a diameter to provide a thrust shoulder for the inner ring of the bearing 17, the said bearing at its other end engaging with the shoulder 15 of the shaft 10. The outer ring of the bearing 17 may engage at one end with an annular plate 22 bolted or otherwise secured to the inner wall of the hub as at 23, the said ring forming an inner lock shoulder for the bearing 17.

A cover 25, preferably of aluminum, is secured to the hub 11 as by bolts 26 or the like, thus forming a front closure for the hub. The cover is provided with an annular shoulder 28 which cooperates with the outer ring of the bearing 17 to form an outer lock shoulder therefor.

From the above general description, it will be seen that the hub 11 constituting the driven member is supported on the bearing 17 forming the main end bearing of the drive shaft 10. The axial disposition of the bearing 17 is such that the propeller blades 13 are generally in line with this main bearing 17 of the assembly. It is proposed that the bearing 17 be of the double ball type as illustrated, altho an equivalent form of bearing may be substituted. Thus the described arrangement has the advantage of balanced torque by the use of the double ball bearing 17 disposed substantially at the center line of the propeller blades and carrying the load thereof.

Considering now the gear train, the power shaft 10 is provided with a gear surface which may comprise gear teeth 30 with which mesh primary spur gears 31, 32, respectively, and preferably disposed along a diameter of an internal ring gear 33. The gears 31, 32 rotate on stub shafts 34, 35, respectively, which are fixedly secured to a partition plate or wall 36 cast integral or otherwise rigidly joined with arms 37 which are fastened to the motor frame or motor bed by any desired means. The means for securing the shafts 34, 35 to the partition may generally comprise a locking nut 38 threaded on to the end of the shafts and engaging the rear face of the partition 36. Intermediate the ends of each of the shafts 34, 35, there is provided a collar 39 which engages with the front face of the partition 36, said collars 39, in conjunction with the shaft heads 40, forming lock shoulders for bearings 41, 42, respectively, on which the gears 31, 32 rotate.

By reference to Fig. 2, the gears 31, 32 mesh with intermediate or secondary spur gears 45, 46, respectively, rotating on stub shafts 47 fixed to the partition 36 in substantially the same manner as are the shafts 34, 35. The gears 45, 46 in turn mesh with the internal ring gear 33 which is preferably of hard metal such as steel and cast into the skirt 11a of hub 11. The gears 31, 32 are disposed an equal radius R from the center of the gear assembly which is the center of the drive shaft 10, whereas the disposition of the gears 45, 46 is along a different radius $R_1$. By this arrangement of gear mounting, it is possible to construct the speed reducer in which the driven gear 33 is of a uniform over all dimension for different speeds, by merely substituting for the intermediate gears 31, 32 and 45, 46, gears of different effective diameters. By analysis of the arrows indicating the direction of rotation of the various gears, it will be seen that the resultant pressure is "in" or toward the direction of rotation in which the gears are pulling. The skirt or cowl portion 11a of the hub is of a diameter to extend over and engage loosely the partition 36, the inner cylindrical wall of the skirt being preferably threaded as at 50 in a right hand direction, thus to return lubricant to the interior of the hub which might otherwise flow past the partition 36. I also provide a lubricant seal in the form of an oil ring 51 which is fixed in the skirt portion 11a of the hub intermediate the ring gear 33 and the partition 36, the inner periphery of said ring being beveled as at 52 from the root of the teeth of the ring gear. I may further provide an outer oil ring 53 secured to the end wall of the hub skirt and depending interiorly therefrom past the outer periphery of the partition 36.

From the above, it will be apparent that the drive shaft 10 supports an end bearing 17 which is common to the driven element including the ring gear 33 and hub 11. This arrangement has many advantages over known reducing gear in the function of the bearing 17 in balancing the tortional strains resulting from the load on the propeller blades. By the disposition of the primary and secondary spur gearing on different radii from the center of the drive shaft 10, it is possible to obtain a high mechanical efficiency, while at the same time permitting substitution of the intermediate gearing whereby to obtain different speeds of the driven element. Further, the gear train is effectively cowled within the hub and hub skirt 11 and 11a, respectively, and the axial length of the assembly is reduced to a minimum within the consequent reduction of power losses.

It will be seen that the several objects of the invention are achieved and other advantageous results attained. As many changes could be made in carrying out the above invention, without departing from the scope thereof, it is intended that all matter contained in the above description or shown in the accompanying drawing shall be interpreted as illustrative and not in a limiting sense.

I claim:

1. In a driving mechanism for aeronautical propellers, the combination of a power shaft, a propeller hub into which the shaft extends, a bearing common to said shaft and hub, the hub being provided with a cowling extension, a fixed partition disposed within said extension and thru which the shaft extends, an external gear surface on the shaft, a ring gear carried by the cowling extension, and gear means mounted on the partition and extending into the extension and operative between the shaft and ring gear to rotate the hub on said bearing.

2. In a driving mechanism for aeronautical propellers, the combination of a power shaft, a propeller hub into which the shaft extends, a bearing common to said shaft and hub, the hub being provided with a cowling extension, a fixed partition disposed within said extension and thru which the shaft extends, an external gear surface on the shaft, a ring gear carried by the cowling extension, and gearing interposed between the shaft and ring gear and mounted on said partition to rotate the hub on the bearing at a reduced speed with respect to the shaft.

Signed at Emaus, Pennsylvania this 27th day of January, 1930.

CHARLES M. SCHAEFFER.